US012742354B2

(12) United States Patent
Zhao et al.

(10) Patent No.: US 12,742,354 B2
(45) Date of Patent: Sep. 22, 2026

(54) VACUUM GLASS AND VACUUM GLASS WINDOW

(71) Applicant: LUOYANG LANDVAC Ti-VIG CO. LTD., Luoyang (CN)

(72) Inventors: Yan Zhao, Luoyang (CN); Hongxia Zhang, Luoyang (CN); Yafei Zhang, Luoyang (CN); Haiyang Li, Luoyang (CN); Yinliang Chen, Luoyang (CN); Jinzhu Li, Luoyang (CN)

(73) Assignee: LUOYANG LANDVAC Ti-VIG CO. LTD., Luoyang (CN)

( * ) Notice: Subject to any disclaimer, the term of this patent is extended or adjusted under 35 U.S.C. 154(b) by 236 days.

(21) Appl. No.: 18/605,813

(22) Filed: Mar. 14, 2024

(65) Prior Publication Data

US 2024/0318495 A1 Sep. 26, 2024

(51) Int. Cl.
*E06B 3/66* (2006.01)
*E06B 3/663* (2006.01)

(52) U.S. Cl.
CPC .......... *E06B 3/6612* (2013.01); *E06B 3/6621* (2013.01); *E06B 3/66333* (2013.01); *E06B 2003/66338* (2013.01)

(58) Field of Classification Search
CPC .. E06B 3/6612; E06B 3/6621; E06B 3/66333; E06B 2003/66338
See application file for complete search history.

(56) References Cited

U.S. PATENT DOCUMENTS

2018/0319707 A1* 11/2018 Ishibashi ............... E06B 3/6612
2018/0320436 A1* 11/2018 Abe ........................ C03C 27/06
2020/0039866 A1* 2/2020 Ishibashi ............. E06B 3/67334
2020/0123040 A1* 4/2020 Lian ....................... E06B 3/6775
2020/0131841 A1* 4/2020 Abe ....................... E06B 3/6612
2020/0181013 A1* 6/2020 Ishibashi ................... E06B 3/66
2020/0340293 A1* 10/2020 Inaoka .................... C03C 27/06
2021/0199367 A1* 7/2021 Kim ...................... F25D 23/028
2021/0262280 A1* 8/2021 Hasegawa ............... B32B 17/10
2024/0026729 A1* 1/2024 Gong .................... E06B 3/6775
2024/0301745 A1* 9/2024 Miki ................... E06B 3/66309

* cited by examiner

*Primary Examiner* — Gisele D Ford
(74) *Attorney, Agent, or Firm* — DLA PIPER LLP (US); Blake W. Jackson; Thomas J. Fuller

(57) ABSTRACT

A vacuum glass and a vacuum glass window are provided. The vacuum glass includes two glass sheets, a vacuum layer arranged between the two glass sheets, multiple supporting members arranged within the vacuum layer, a sealing portion that seals the vacuum layer arranged on an edge portion of the vacuum layer, and a strip-shaped getter arranged within the vacuum layer. The strip-shaped getter is arranged close to and substantially parallel to the sealing portion at a side of the vacuum glass. The distance between an outer edge of the strip-shaped getter and an inner wall of the sealing portion is not less than about 0.2 millimeters. The vacuum glass window includes a window frame and the above-mentioned vacuum glass. By optimizing the distance between the strip-shaped getter and the sealing portion, the arrangement of the strip-shaped getter will not affect the sealing quality of the sealing portion.

17 Claims, 8 Drawing Sheets

VACUUM GLASS AND VACUUM GLASS WINDOW

CROSS-REFERENCED APPLICATIONS

This application claims the benefit of priority from Chinese Patent Application No. 202320553478.1 entitled "Vacuum Glass and Vacuum Glass Window" and Chinese Design Patent Application No. 202330135015.9 entitled "Vacuum Glass," both of which were filed on Mar. 21, 2023. The entire contents of the above applications are incorporated herein by reference.

TECHNICAL FIELD

The present disclosure generally relates to a vacuum glass and a vacuum glass window.

BACKGROUND

A basic structure of an existing vacuum glass includes a disc getter and a slot on the inner side of a vacuum layer to accommodate the disc getter. The vacuum glass may further include an air outlet. Although a vacuum degree of the vacuum glass can be maintained by the getter and the air outlet, the complicated process results in increased production costs and reduced production efficiencies. In addition, it may take extra efforts to hide the disc getter and the air outlet when mounting the vacuum glass to a window frame, in order to generate a better aesthetic appearance of the vacuum glass window.

An improved structure of an existing vacuum glass includes a strip-shaped getter arranged close to a sealing portion of the vacuum glass. However, the width of the strip-shaped getter, the width of the sealing portion, and the distance between the strip-shaped getter and the sealing portion may affect the sealing quality of the vacuum glass or the aesthetic appearance of the vacuum glass window after mounting the vacuum glass to a window frame.

The above content is only used to assist in understanding the technical solutions of the present disclosure, and does not constitute an admission that the above is prior art.

SUMMARY

The present disclosure provides a vacuum glass and a vacuum glass window that addresses the problems in the related art, such as the problems described above. For example, by optimizing the distances between the strip-shaped getter and the sealing portion and between the strip-shaped getter and the outer edge of the vacuum glass, it is ensured that activation of the strip-shaped getter after the arrangement does not interfere with heating and sealing of the sealing portion during the production of the vacuum glass and vice versa, so that the position of the strip-shaped getter does not affect sealing quality of the sealing portion. Further, since the position and dimension of the strip-shaped getter are optimized, and the strip-shaped getter may be close to the sealing portion, when the vacuum glass is mounted, the strip-shaped getter may be hidden inside the window frame and the press strip or sealant on the inner side of the window frame. The hidden shaped getter generates a better aesthetic appearance without additional efforts of hiding.

To achieve the above objectives, some exemplary embodiments of the present disclosure provide a vacuum glass. The vacuum glass may include a first glass sheet, a second glass sheet, a vacuum layer arranged between the first glass sheet and the second glass sheet, multiple supporting members arranged within the vacuum layer, a sealing portion arranged on an edge portion of the vacuum layer, and a strip-shaped getter arranged within the vacuum layer. In some embodiments, the sealing portion may be configured to seal the vacuum layer, and the strip-shaped getter may be arranged close to and substantially parallel to the sealing portion at a first side of the vacuum glass. In some embodiments, the distance between the outer edge of the strip-shaped getter and the inner wall of the sealing portion at the first side of the vacuum glass may be larger than or equal to about 0.2 millimeter ("mm").

In some embodiments, the distance between the inner edge of the strip-shaped getter and the outer edge of the vacuum glass may range from about 6 mm to about 35 mm. In some embodiments, the distance between the inner edge of the strip-shaped getter and the outer edge of the vacuum glass may range from about 10 mm to about 25 mm.

In some embodiments, the width of the strip-shaped getter may range from about 2 mm to about 8 mm. In some embodiments, the width of the sealing portion may range from about 3 mm to about 10 mm.

In some embodiments, the strip-shaped getter may be a non-evapotranspiration getter. In some embodiments, the sealing portion may be a metal sealing portion or a glass sealing portion.

In some embodiments, the inner side of the first glass sheet and the inner side of the second glass sheet may not include a getter accommodating groove. In some embodiments, the vacuum glass may not include an air outlet. In this way, the production efficiency may be improved, production costs may be reduced, and the breakage rate of the vacuum glass may be decreased.

In some embodiments, the vacuum glass may include one or more sets of strip-shaped getters. In some embodiments, each set of each set of strip-shaped getters may include one or more strip-shaped getters.

In some embodiments, the vacuum glass may include a first set of strip-shaped getters at the first side of the vacuum glass. In some embodiments, the first set of strip-shaped getters may include one or more strip-shaped getters.

In some embodiments, the vacuum glass may include a first set of strip-shaped getters at the first side of the vacuum glass and a second set of strip-shaped getters at a second side of the vacuum glass. In some embodiments, each of the first set of strip-shaped getters and the second set of strip-shaped getters may include one or more strip-shaped getters.

In some embodiments, the vacuum glass may include a first set of strip-shaped getters at the first side of the vacuum glass, a second set of strip-shaped getters at a second side of the vacuum glass, and a third set of strip-shaped getters at a third side of the vacuum glass. In some embodiments, each of the first set of strip-shaped getters, the second set of strip-shaped getters, and the third set of strip-shaped getters may include one or more strip-shaped getters.

In some embodiments, the vacuum glass may include a first set of strip-shaped getters at the first side of the vacuum glass, a second set of strip-shaped getters at a second side of the vacuum glass, a third set of strip-shaped getters at a third side of the vacuum glass, and a fourth set of strip-shaped getters at a fourth side of the vacuum glass. In some embodiments, each of the first set of strip-shaped getters, the second set of strip-shaped getters, the third set of strip-shaped getters, and the fourth set of strip-shaped getters may include one or more strip-shaped getters.

Some exemplary embodiments of the present disclosure further provide a vacuum glass window. The vacuum glass window includes a window frame and any of the vacuum glass as describe above.

In some embodiments, the inner edge of the strip-shaped getter may not exceed the inner edge of the window frame at the first side of the vacuum glass window.

In some embodiments, the inner edge of the strip-shaped getter may not exceed the inner edge of a press strip or a sealant arranged on the inner side of the window frame at the first side of the vacuum glass window.

In some embodiments, the vacuum glass window may include a third glass sheet. In some embodiments, a vacuum layer, an adhesive layer, or a hollow layer may be formed between the third glass and the vacuum glass.

Note that the various embodiments described above can be combined with any other embodiments described herein. The features and advantages described in the disclosure are not all-inclusive and, in particular, many additional features and advantages will be apparent to one of ordinary skill in the art in view of the drawings, specification, and claims. Moreover, it should be noted that the language used in the disclosure has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
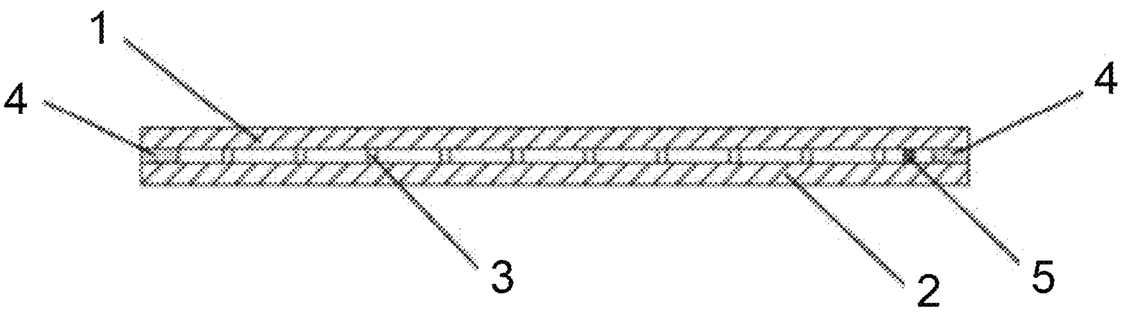
FIG. 1 is a front view of a schematic structural diagram of a vacuum glass, according to some embodiments of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

For ease of description, spatially relative terms such as "upper," "lower," "left," and "right" may be used herein to describe a relationship of one element or feature relative to another element or feature illustrated in the figures. It should be understood that spatial terms are intended to include different orientations of a device in use or operation in addition to the orientation illustrated in the figures. For example, if an apparatus in the figures is turned over, an element described as being located "below" another element or feature will then be positioned "above" another element or feature. Therefore, the exemplary term "below" may include two orientations: "above" and "below." The apparatus may be positioned in other different manners (rotating by 90 degrees or being located at other orientations), and space-related descriptions used herein may be used for explanation accordingly.

As discussed above, to resolve the problem in the related technologies, in some embodiments, a vacuum glass and a vacuum glass window are disclosed in the present disclosure.

Embodiment 1

Figure 2:
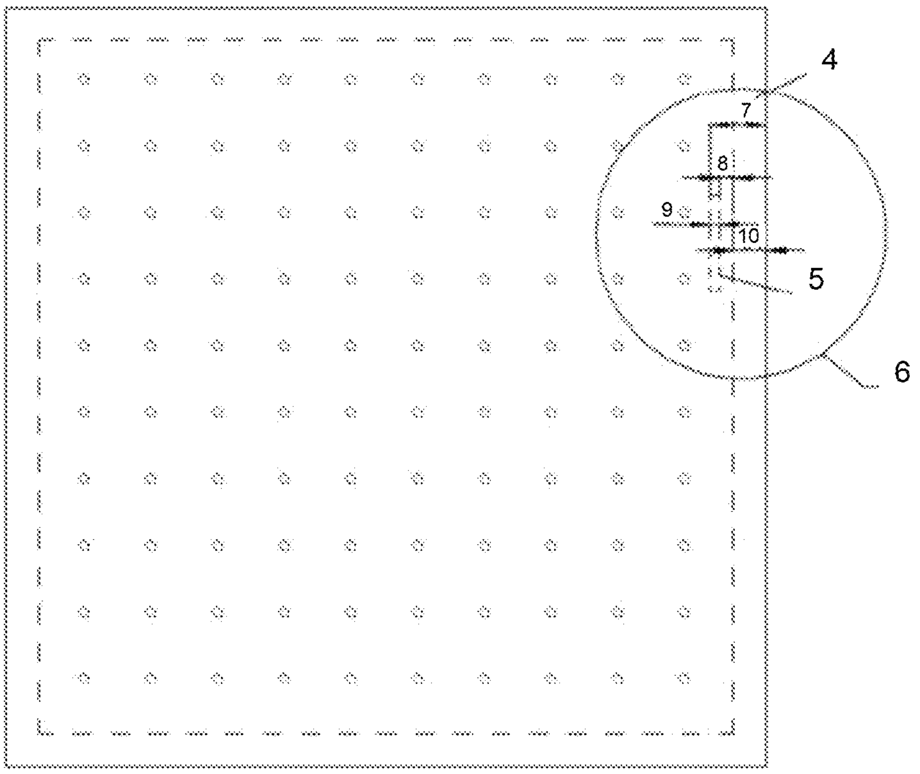
FIG. 2 is a top view of a schematic structural diagram of the vacuum glass in FIG. 1, according to some embodiments of the present disclosure.
Figure 3:
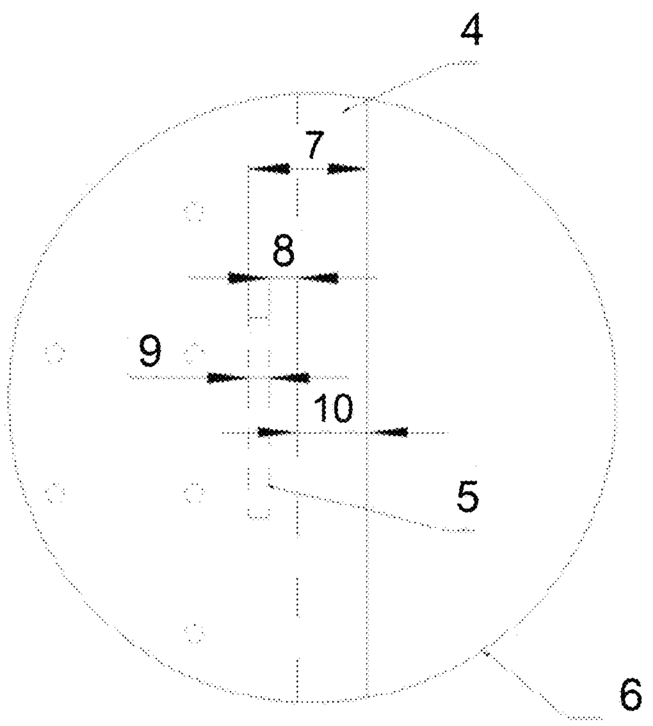
FIG. 3 is an enlarged schematic view of Region 6 in FIG. 2, according to some embodiments of the present disclosure.

A vacuum glass in Embodiment 1 is shown in FIGS. 1 through 3. FIG. 1 is a front view of a schematic structural diagram of the vacuum glass in Embodiment 1; FIG. 2 is a top view of a schematic structural diagram of the vacuum glass in FIG. 1; and FIG. 3 is an enlarged schematic view of Region 6 in FIG. 2.

The vacuum glass includes upper glass sheet 1, lower glass sheet 2, and sealing portion 4. Upper glass sheet 1, lower glass sheet 2, and sealing portion 4 enclose a vacuum layer, where sealing portion 4 is arranged on an edge portion of the vacuum layer and configured to seal the vacuum layer. In some embodiments, the vacuum glass has a rectangular shape with four sides. In some embodiments, sealing portion 4 is arranged close to the four sides of the vacuum glass, forming a rectangular shape with right-angle corners or rounded corners.

In some embodiments, multiple supporting members 3 are arranged within the vacuum layer. Supporting members 3 are used for avoiding contact between upper glass sheet 1 and lower glass sheet 2. In some embodiments, strip-shaped getter 5 is arranged in the vacuum layer. In some embodiments, strip-shaped getter 5 is arranged close to and substantially parallel to sealing portion 4 at a side of the vacuum glass.

In some embodiments, distance 7 between an inner edge of strip-shaped getter 5 and an outer edge of the vacuum glass ranges from about 6 mm to about 35 mm. In some embodiments, distance 7 between the inner edge of strip-shaped getter 5 and the outer edge of the vacuum glass ranges from about 10 mm to about 25 mm.

In some embodiments, distance 8 between an outer edge of strip-shaped getter 5 and an inner wall of sealing portion 4 may be larger than or equal to about 0.2 mm.

In some embodiments, width 9 of strip-shaped getter 5 ranges from about 2 mm to about 8 mm. In some embodiments, width 10 of sealing portion 4 ranges from about 3 mm to about 10 mm.

For example, in Embodiment 1, distance 7 between the inner edge of strip-shaped getter 5 and the outer edge of the vacuum glass is about 15 mm, distance 8 between the outer edge of strip-shaped getter 5 and the inner wall of sealing portion 4 is about 2 mm, width 9 of strip-shaped getter 5 is about 4 mm, and width 10 of sealing portion 4 is about 9 mm.

By optimizing the distances between strip-shaped getter 5 and sealing portion 4 and between strip-shaped getter 5 and the outer edge of the vacuum glass, it is ensured that activation of strip-shaped getter 5 after the arrangement does not interfere with the heating and sealing of sealing portion 4 during the production of the vacuum glass and vice versa, so that the position of strip-shaped getter 5 does not affect sealing quality of sealing portion 4. In addition, strip-shaped getter 5 is arranged close to sealing portion 4. When the vacuum glass is mounted to a window frame subsequently, strip-shaped getter 5 is hidden inside the window frame and the press strip or the sealant at the inner side of the window frame such that the aesthetic appearance is improved without additional efforts of hiding.

In some embodiments, upper glass sheet 1 and lower glass sheet 2 have the same dimension. In some embodiments, according to an actual requirement, the dimension of upper glass sheet 1 may be larger or smaller than that of lower glass sheet 2, forming the vacuum glass with a structure of a large sheet and a small sheet. In this case, distance 7 refers to a distance between the inner edge of strip-shaped getter 5 and an outer edge of the smaller glass sheet of the vacuum glass.

In some embodiments, sealing portion 4 may be a metal sealing portion. The metal sealing portion includes two sintered metalized layers respectively consolidated on surfaces of the two glass sheets and a braze welding layer that welds and connects the two metalized layers. In some embodiments, sealing portion 4 may be a glass scaling portion.

In some embodiments, strip-shaped getter 5 may be a non-evapotranspiration getter. By using a getter with a strip shape, a larger strip-shaped getter area may be provided such that an absorbing range may be larger, and a greater vacuum degree may be maintained.

In some embodiments, upper glass sheet 1 and lower glass sheet 2 of the vacuum glass may not be provided with a strip-shaped getter accommodating groove. This not only reduces a gouging process to improve production efficiency, but also avoids a reduction in product strength resulting from the gouging process and a high breakage rate caused during the gouging process.

In some embodiments, the vacuum glass may not include an air outlet. In some embodiments, upper glass sheet 1 and lower glass sheet 2 are not provided with an air outlet, further simplifying manufacturing process.

Embodiment 2

Figure 4:
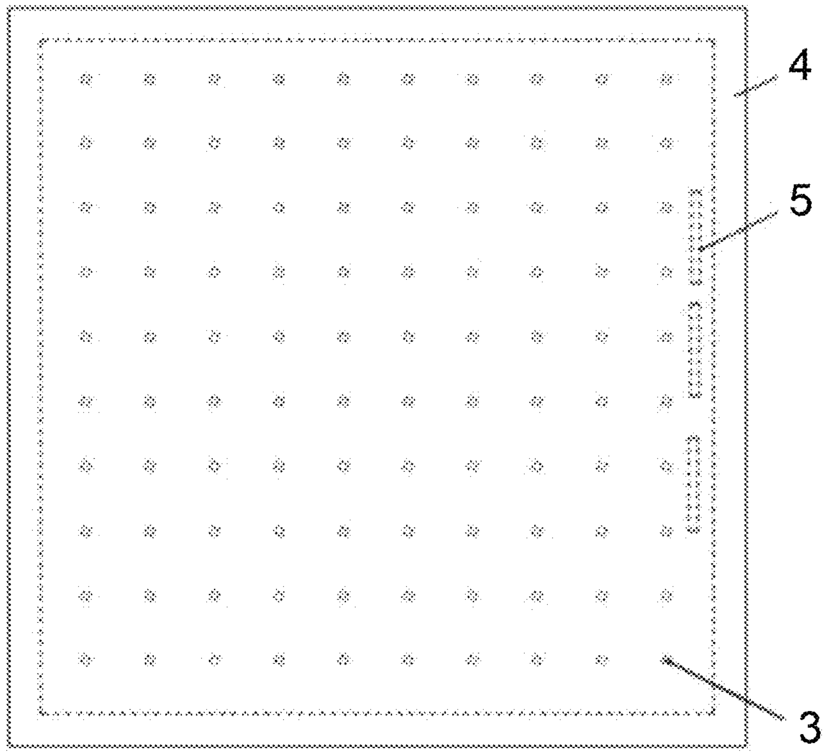
FIG. 4 is a top view of a schematic structural diagram of a vacuum glass, according to some embodiments of the present disclosure.

As shown in FIG. 4, a vacuum glass in Embodiment 2 is similar to the vacuum glass in Embodiment 1. The vacuum glass includes an upper glass sheet, a lower glass sheet, and scaling portion 4. The upper glass sheet, the lower glass sheet, and scaling portion 4 enclose a vacuum layer, where sealing portion 4 is arranged on an edge portion of the vacuum layer and configured to seal the vacuum layer. In some embodiments, the vacuum glass has a rectangular shape with four sides. In some embodiments, sealing portion 4 is arranged close to the four sides of the vacuum glass, forming a rectangular shape with right-angle corners or rounded corners. In some embodiments, multiple supporting members 3 are arranged within the vacuum layer to avoid contact between the upper glass sheet and the lower glass sheet.

The vacuum glass in Embodiment 2 includes three strip-shaped getters 5 arranged in the vacuum layer. Three strip-shaped getters 5 are arranged in line, all of which are close to and substantially parallel to sealing portion 4 at a side of the vacuum glass. It should be understood that multiple strip-shaped getters 5 may be adopted according to the size of the glass sheet of the vacuum glass and the volume of the vacuum layer, in order to maintain a vacuum degree of the vacuum glass.

Each strip-shaped getter 5 is specifically arranged as follows: the distance between the inner edge of strip-shaped getters 5 and the outer edge of the vacuum glass is about 20 mm, the distance between the outer edge of strip-shaped getters 5 and the inner wall of sealing portion 4 is about 2 mm, the width of each strip-shaped getter 5 is about 8 mm, and the width of sealing portion 4 is about 10 mm.

By optimizing the distances between strip-shaped getter 5 and sealing portion 4 and between strip-shaped getter 5 and the outer edge of the vacuum glass, it is ensured that activation of strip-shaped getter 5 after the arrangement does not interfere with the heating and sealing of sealing portion 4 during the production of the vacuum glass and vice versa, so that the position of strip-shaped getter 5 does not affect sealing quality of sealing portion 4. In addition, strip-shaped getter 5 is arranged close to sealing portion 4. When the vacuum glass is mounted to a window frame subsequently, strip-shaped getter 5 is hidden inside the window frame and the press strip or the sealant at the inner side of the window frame such that the aesthetic appearance is improved without additional efforts of hiding.

Embodiment 3

Figure 5:
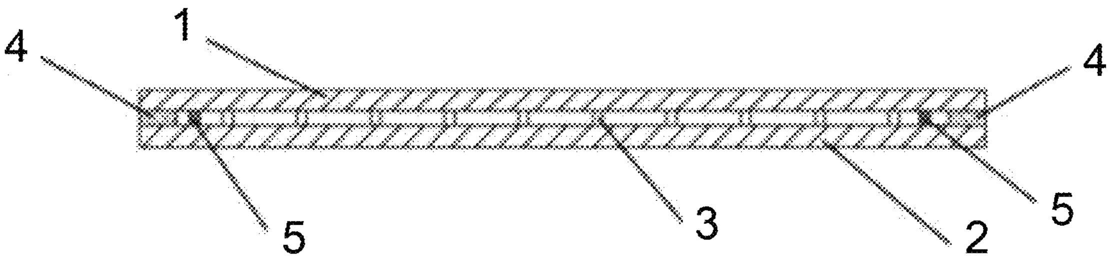
FIG. 5 is a front view of a schematic structural diagram of a vacuum glass, according to some embodiments of the present disclosure.
Figure 6:
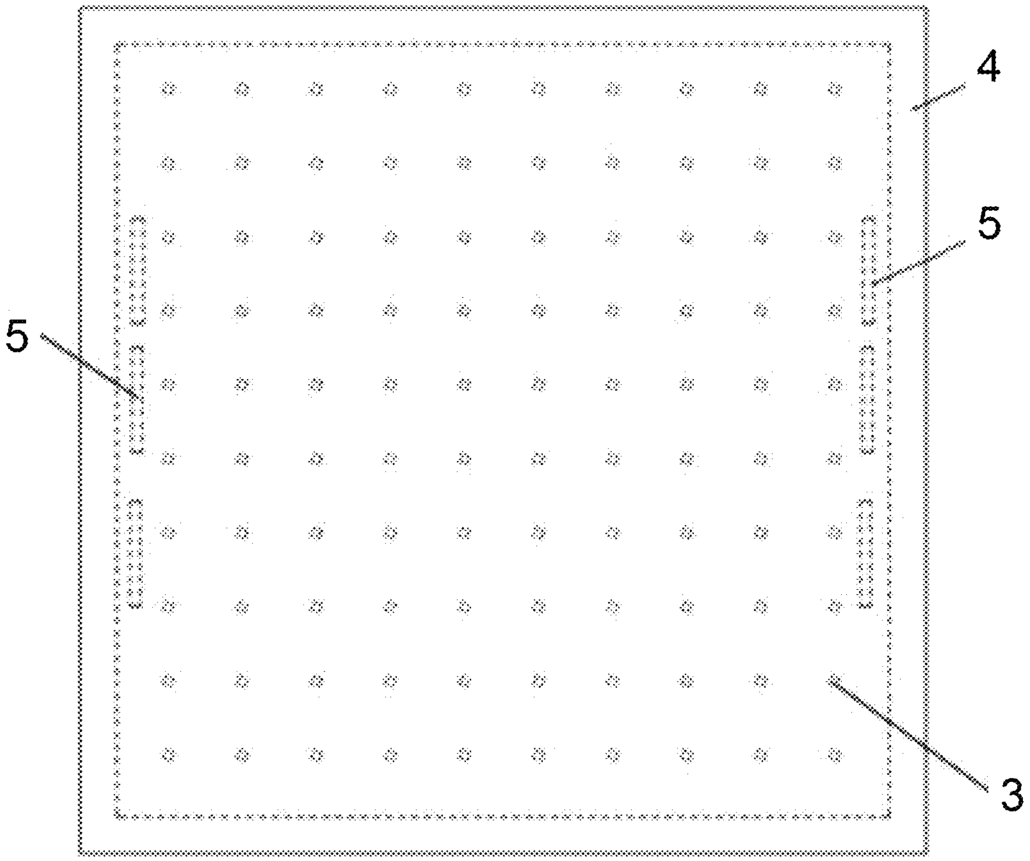
FIG. 6 is a top view of a schematic structural diagram of the vacuum glass in FIG. 5, according to some embodiments of the present disclosure.

As shown in FIGS. 5 and 6, a vacuum glass in Embodiment 3 is similar to the vacuum glass in Embodiment 2. FIG. 5 is a front view of a schematic structural diagram of the vacuum glass in Embodiment 3. FIG. 6 is a top view of a schematic structural diagram of the vacuum glass in FIG. 5.

The vacuum glass includes upper glass sheet 1, lower glass sheet 2, and sealing portion 4. Upper glass sheet 1, lower glass sheet 2, and sealing portion 4 enclose a vacuum layer, where sealing portion 4 is arranged on an edge portion of the vacuum layer and configured to seal the vacuum layer. In some embodiments, the vacuum glass has a rectangular shape with four sides. In some embodiments, sealing portion 4 is arranged close to the four sides of the vacuum glass, forming a rectangular shape with right-angle corners or rounded corners. In some embodiments, multiple supporting members 3 are arranged within the vacuum layer to avoid contact between upper glass sheet 1 and lower glass sheet 2.

The vacuum glass in Embodiment 3 includes two sets of strip-shaped getters 5, and each set of strip-shaped getters 5 is parallel to one side of the vacuum glass. Each set of strip-shaped getters 5 includes three strip-shaped getters 5 arranged in line. All three strip-shaped getters 5 in each set are arranged close to and substantially parallel to sealing portion 4 at a side of the vacuum glass. In some embodiments, the first set of strip-shaped getters 5 is arranged close to sealing portion 4 at a left side of the vacuum glass, and the second set of strip-shaped getters 5 is arranged close to sealing portion 4 at a right side of the vacuum glass.

It should be understood that multiple sets of strip-shaped getters 5 may be adopted according to the size of the glass sheet of the vacuum glass and the volume of the vacuum layer. By adopting multiple sets of strip-shaped getters 5, an absorbing range may be larger and a greater vacuum degree may be maintained. In some embodiments, at least two sets of strip-shaped getters 5 may be used. In some embodiments, each set of strip-shaped getters 5 may include one strip-shaped getter 5 or multiple strip-shaped getters 5.

Each set of strip-shaped getters 5 is specifically arranged as follows: the distance between the inner edge of strip-shaped getters 5 and the outer edge of the vacuum glass is about 15 mm, the distance between the outer edge of strip-shaped getters 5 and the inner wall of sealing portion 4 is about 3 mm, the width of each strip-shaped getter 5 is about 4 mm, and the width of sealing portion 4 is about 8 mm.

By optimizing the distances between strip-shaped getter 5 and scaling portion 4 and between strip-shaped getter 5 and the outer edge of the vacuum glass, it is ensured that activation of strip-shaped getter 5 after the arrangement does not interfere with the heating and sealing of sealing portion 4 during the production of the vacuum glass and vice versa, so that the position of strip-shaped getter 5 does not affect scaling quality of sealing portion 4. In addition, strip-shaped getter 5 is arranged close to sealing portion 4. When the vacuum glass is mounted to a window frame subsequently, strip-shaped getter 5 is hidden inside the window frame and the press strip or the sealant at the inner side of the window frame such that the aesthetic appearance is improved without additional efforts of hiding.

Embodiments 4-10

The present disclosure further provides the vacuum glass in Embodiments 4 through 10, which are improved based on the vacuum glass disclosed in Embodiment 1.

substantially parallel to sealing portion 4 at a side of the vacuum glass.

Referring back to FIGS. 2 and 3, distance 7 refers to the distance between an inner edge of strip-shaped getter 5 and an outer edge of the vacuum glass. In some embodiments, upper glass sheet 1 and lower glass sheet 2 have the same dimension. In some embodiments, according to an actual requirement, the dimension of upper glass sheet 1 may be larger or smaller than that of lower glass sheet 2, forming the vacuum glass with a structure of a large sheet and a small sheet. In this case, distance 7 refers to the distance between the inner edge of strip-shaped getter 5 and an outer edge of the smaller glass sheet of the vacuum glass.

In some embodiments, distance 7 between the inner edge of strip-shaped getter 5 and the outer edge of the vacuum glass ranges from about 6 mm to about 35 mm. In some embodiments, distance 7 between the inner edge of strip-shaped getter 5 and the outer edge of the vacuum glass ranges from about 10 mm to about 25 mm.

Referring back to FIGS. 2 and 3, distance 8 refers to the distance between an outer edge of strip-shaped getter 5 and an inner wall of sealing portion 4; width 9 refers to a width of strip-shaped getter 5; and width 10 refers to a width of sealing portion 4.

In some embodiments, distance 8 between the outer edge of strip-shaped getter 5 and the inner wall of sealing portion 4 may be larger than or equal to about 0.2 mm. In some embodiments, width 9 of strip-shaped getter 5 ranges from about 2 mm to about 8 mm. In some embodiments, width 10 of sealing portion 4 ranges from about 3 mm to about 10 mm.

Embodiments 4 through 10 show the different positional arrangements of strip-shaped getters, e.g., the distances between the strip-shaped getter and the sealing portion and between the strip-shaped getter and the outer edge of the vacuum glass. Specific parameters are listed as follows (unit: mm):

| | Distance 7 between the inner edge of strip-shaped getter 5 and the outer edge of the vacuum glass | Distance 8 between the outer edge of strip-shaped getter 5 and the inner wall of sealing portion 4 | Width 9 of strip-shaped getter 5 | Width 10 of sealing portion 4 |
|---|---|---|---|---|
| Embodiment 4 | 10 | 1 | 3 | 6 |
| Embodiment 5 | 20 | 12 | 5 | 9 |
| Embodiment 6 | 25 | 7 | 8 | 8 |
| Embodiment 7 | 6.2 | 0.2 | 3 | 3 |
| Embodiment 8 | 15 | 5 | 5 | 5 |
| Embodiment 9 | 30 | 12 | 8 | 10 |
| Embodiment 10 | 35 | 19 | 6 | 10 |

Referring back to FIGS. 1 through 3, the vacuum glass includes upper glass sheet 1, lower glass sheet 2, and scaling portion 4. Upper glass sheet 1, lower glass sheet 2, and sealing portion 4 enclose a vacuum layer, where sealing portion 4 is arranged on an edge portion of the vacuum layer and configured to seal the vacuum layer. In some embodiments, multiple supporting members 3 are arranged within the vacuum layer to avoid contact between upper glass sheet 1 and lower glass sheet 2. In some embodiments, strip-shaped getter 5 is arranged in the vacuum layer. In some embodiments, strip-shaped getter 5 is arranged close to and By optimizing the distances between strip-shaped getter 5 and sealing portion 4 and between strip-shaped getter 5 and the outer edge of the vacuum glass, it is ensured that activation of strip-shaped getter 5 after the arrangement does not interfere with the heating and sealing of sealing portion 4 during the production of the vacuum glass and vice versa, so that the position of strip-shaped getter 5 does not affect sealing quality of sealing portion 4. In addition, strip-shaped getter 5 is arranged close to sealing portion 4. When the vacuum glass is mounted to a window frame subsequently, strip-shaped getter 5 is hidden inside the window frame and the press strip or the sealant at the inner side of the window frame such that the aesthetic appearance is improved without additional efforts of hiding.

Embodiments 11-20

The present disclosure further provides the vacuum glass in Embodiments 11 through 20, which are improved based on the vacuum glass disclosed in Embodiment 1.

As shown in FIGS. 7A through 7J, the vacuum glass includes an upper glass sheet, a lower glass sheet, and sealing portion 4. The upper glass sheet, the lower glass sheet, and sealing portion 4 enclose a vacuum layer, where sealing portion 4 is arranged on an edge portion of the vacuum layer and configured to seal the vacuum layer. In some embodiments, the vacuum glass has a rectangular shape with four sides. In Embodiments 11-20, sealing portion 4 is arranged close to the four sides of the vacuum glass, forming a rectangular shape with rounded corners. In some embodiments, multiple supporting members 3 are arranged within the vacuum layer to avoid contact between the upper glass sheet and the lower glass sheet.

In some embodiments, a vacuum glass may include one or more strip-shaped getters 5. In some embodiments, a vacuum glass may include one or more sets of strip-shaped getters 5. Each set of strip-shaped getters 5 is arranged close to and substantially parallel to sealing portion 4 at a side of the vacuum glass. Each set of strip-shaped getters 5 may include one or more strip-shaped getters 5.

It should be understood that multiple sets of strip-shaped getters 5 may be adopted according to the size of the glass sheet of the vacuum glass and the volume of the vacuum layer. By adopting multiple sets of strip-shaped getters 5, an absorbing range may be larger and a greater vacuum degree may be maintained. In some embodiments, two sets of strip-shaped getters 5 may be used. In some embodiments, one set of strip-shaped getters 5 includes one strip-shaped getter 5, and the other set of strip-shaped getters 5 includes at least two strip-shaped getters 5. In some embodiments, three sets of strip-shaped getters 5 may be used. In some embodiments, four sets of strip-shaped getters 5 may be used.

Figure 7A:
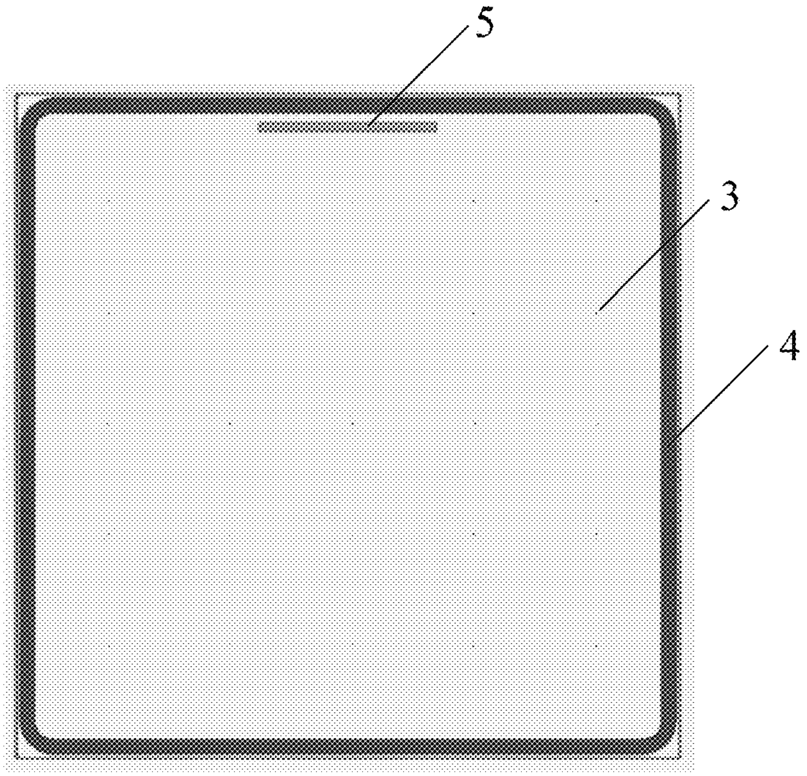
FIGS. 7A through 7J are top views of vacuum glasses with different arrangements of strip-shaped getters, according to some embodiments of the present disclosure.

As shown in FIG. 7A, a vacuum glass in Embodiment 11 includes a first set of strip-shaped getters 5 at an upper side of the vacuum glass, and the first set of strip-shaped getters 5 includes one strip-shaped getter 5.

Figure 7B:
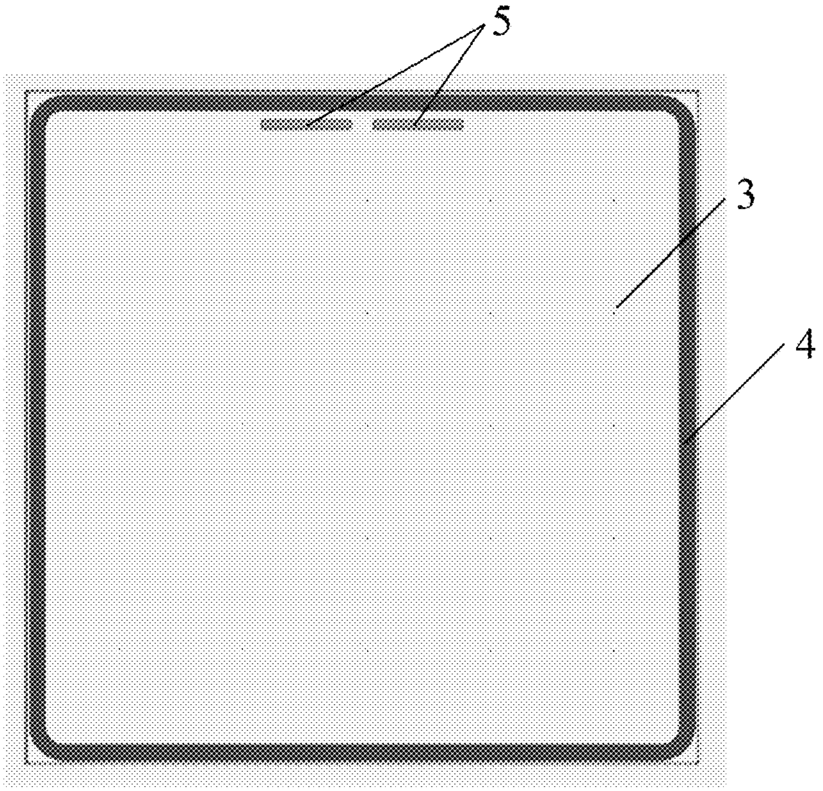

As shown in FIG. 7B, a vacuum glass in Embodiment 12 includes a first set of strip-shaped getters 5 at an upper side of the vacuum glass, and the first set of strip-shaped getters 5 includes two strip-shaped getters 5.

Figure 7C:
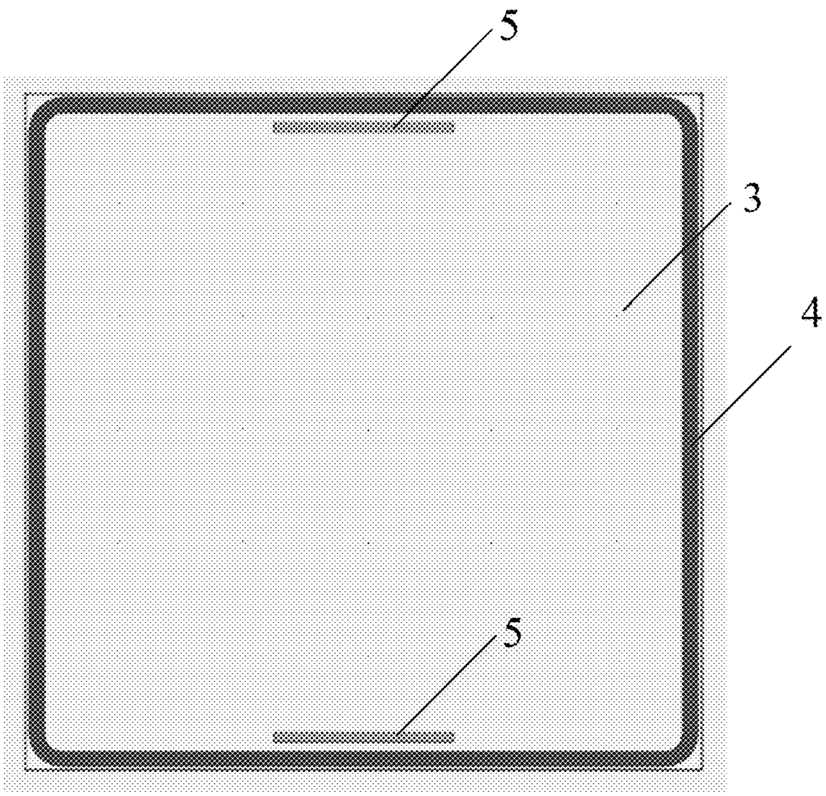

As shown in FIG. 7C, a vacuum glass in Embodiment 13 includes a first set of strip-shaped getters 5 at an upper side of the vacuum glass, and a second set of strip-shaped getters 5 at a lower side of the vacuum glass. Each of the first set and second set of strip-shaped getters 5 includes one strip-shaped getter 5.

Figure 7D:
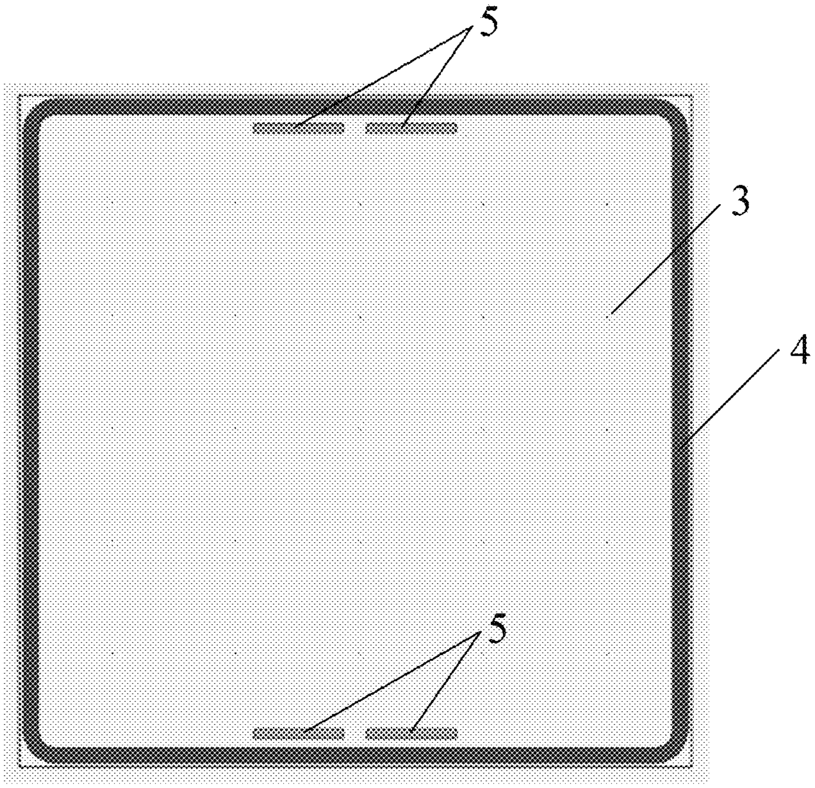

As shown in FIG. 7D, a vacuum glass in Embodiment 14 includes a first set of strip-shaped getters 5 at an upper side of the vacuum glass, and a second set of strip-shaped getters 5 at a lower side of the vacuum glass. Each of the first set and second set of strip-shaped getters 5 includes two strip-shaped getters 5.

Figure 7E:
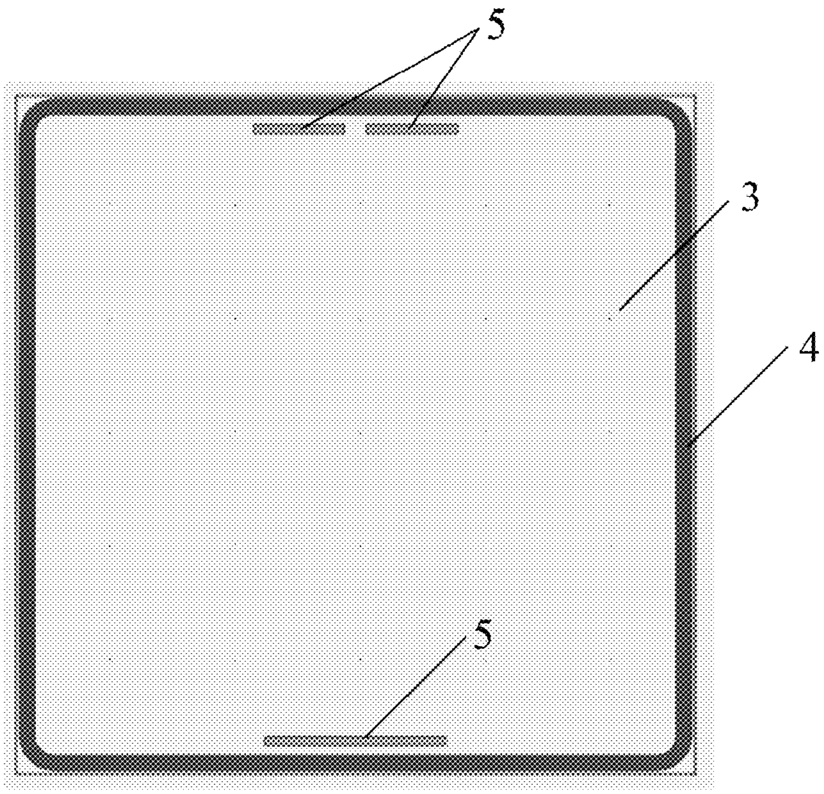

As shown in FIG. 7E, a vacuum glass in Embodiment 15 includes a first set of strip-shaped getters 5 at an upper side of the vacuum glass, and a second set of strip-shaped getters 5 at a lower side of the vacuum glass. The first set of strip-shaped getters 5 includes two strip-shaped getters 5, and the second set of strip-shaped getters 5 includes one strip-shaped getter 5.

Figure 7F:
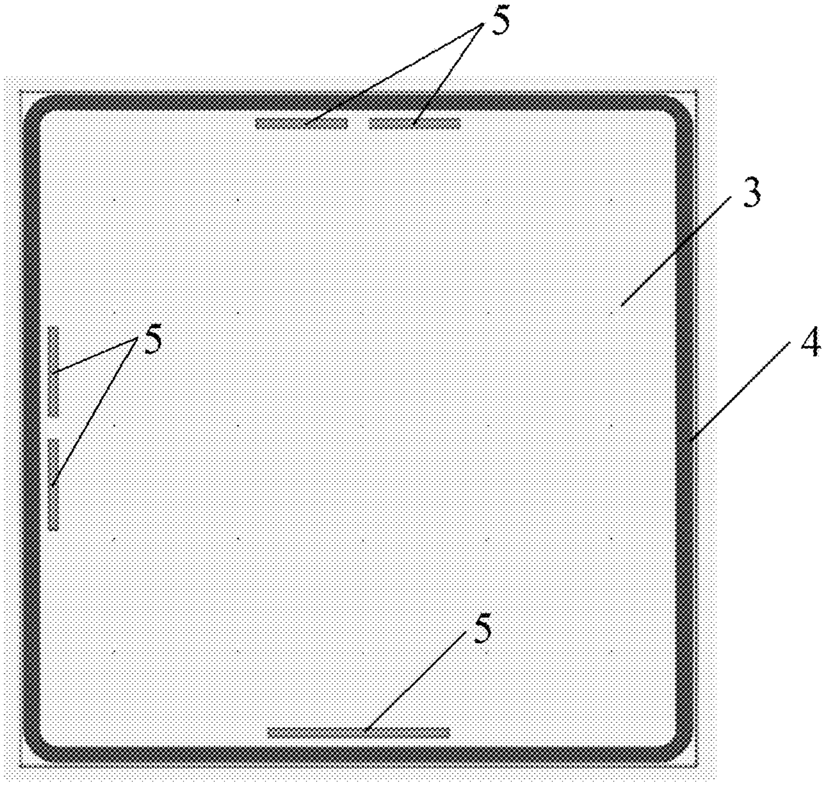

As shown in FIG. 7F, a vacuum glass in Embodiment 16 includes a first set of strip-shaped getters 5 at an upper side of the vacuum glass, a second set of strip-shaped getters 5 at a lower side of the vacuum glass, and a third set of strip-shaped getters 5 at a left side of the vacuum glass. The first set of strip-shaped getters 5 includes two strip-shaped getters 5, the second set of strip-shaped getters 5 includes one strip-shaped getter 5, and the third set of strip-shaped getters 5 includes two strip-shaped getters 5.

Figure 7G:
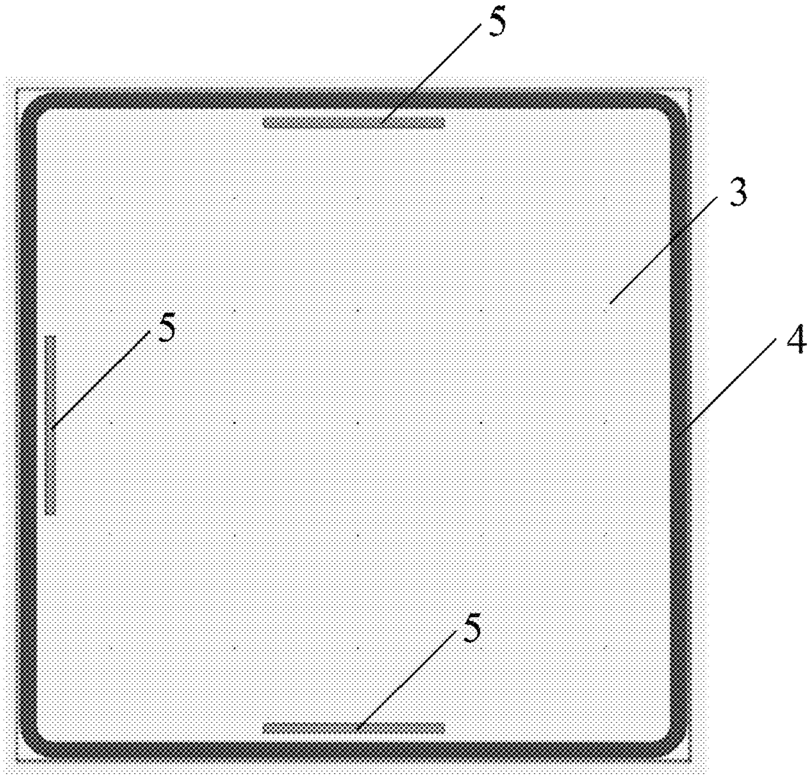

As shown in FIG. 7G, a vacuum glass in Embodiment 17 includes a first set of strip-shaped getters 5 at an upper side of the vacuum glass, a second set of strip-shaped getters 5 at a lower side of the vacuum glass, and a third set of strip-shaped getters 5 at a left side of the vacuum glass. Each of the first set, the second set, and the third set of strip-shaped getters 5 includes one strip-shaped getter 5.

Figure 7H:
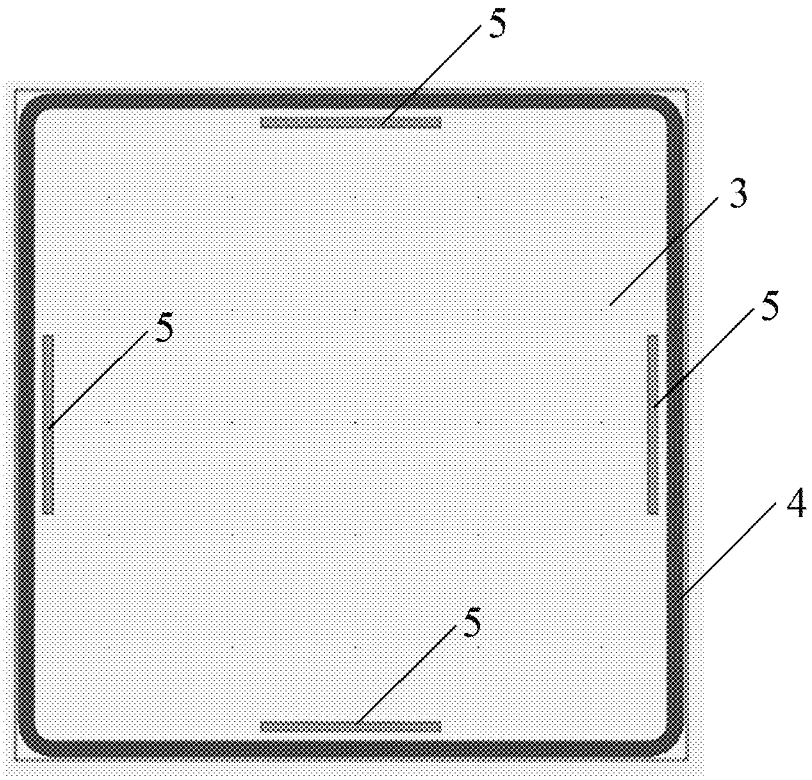

As shown in FIG. 7H, a vacuum glass in Embodiment 18 includes a first set of strip-shaped getters 5 at an upper side of the vacuum glass, a second set of strip-shaped getters 5 at a lower side of the vacuum glass, a third set of strip-shaped getters 5 at a left side of the vacuum glass, and a fourth set of strip-shaped getters 5 at a right side of the vacuum glass. Each of the first set, the second set, the third set, and the fourth set of strip-shaped getters 5 includes one strip-shaped getter 5.

Figure 7I:
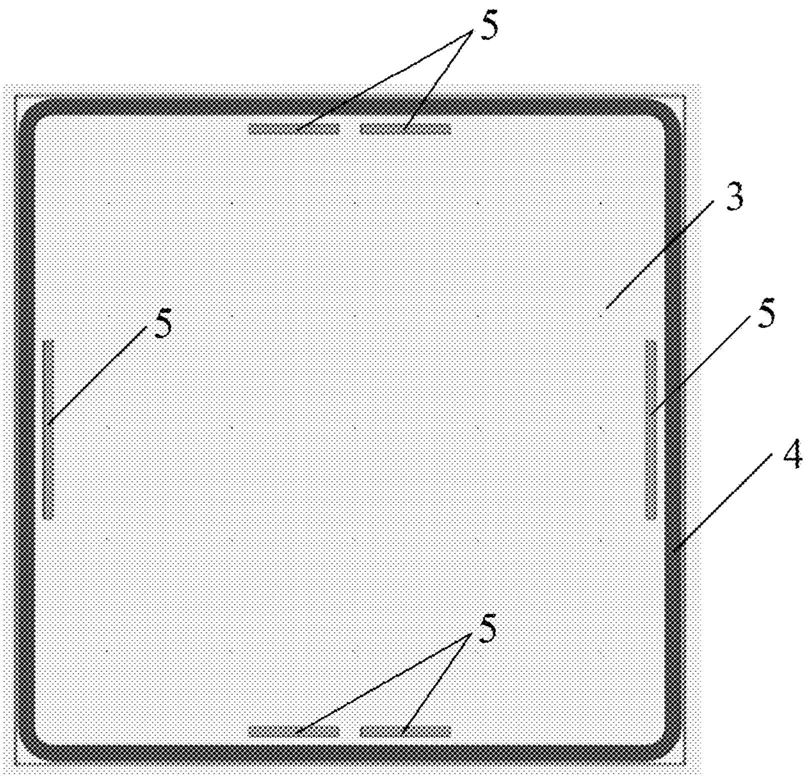

As shown in FIG. 7I, a vacuum glass in Embodiment 18 includes a first set of strip-shaped getters 5 at an upper side of the vacuum glass, a second set of strip-shaped getters 5 at a lower side of the vacuum glass, a third set of strip-shaped getters 5 at a left side of the vacuum glass, and a fourth set of strip-shaped getters 5 at a right side of the vacuum glass. Each of the first set and the second set of strip-shaped getters 5 includes two strip-shaped getters 5, and each of the third set and the fourth set of strip-shaped getters 5 includes one strip-shaped getter 5.

Figure 7J:
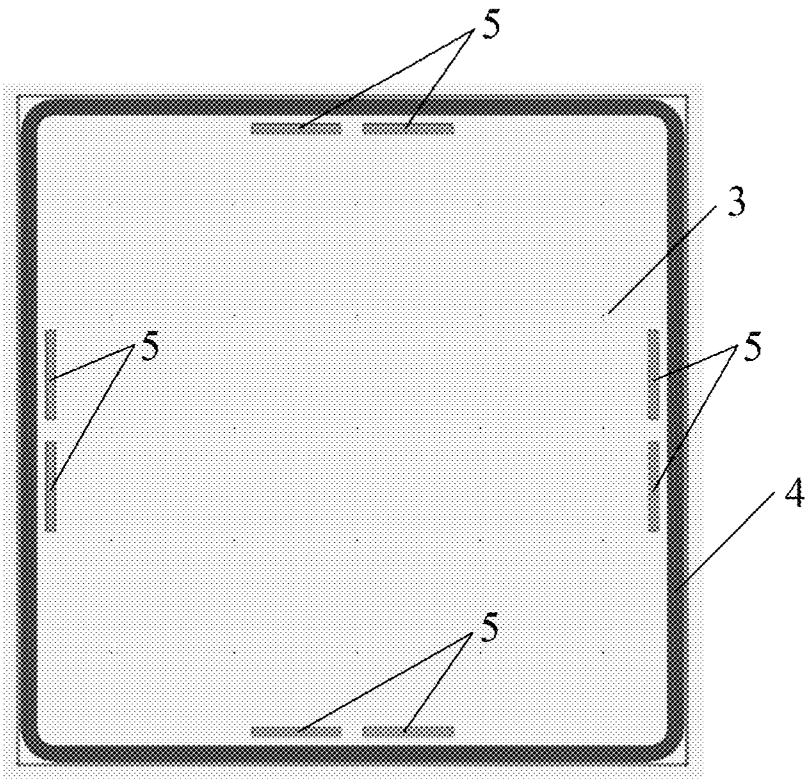

As shown in FIG. 7J, a vacuum glass in Embodiment 20 includes a first set of strip-shaped getters 5 at an upper side of the vacuum glass, a second set of strip-shaped getters 5 at a lower side of the vacuum glass, a third set of strip-shaped getters 5 at a left side of the vacuum glass, and a fourth set of strip-shaped getters 5 at a right side of the vacuum glass. Each of the first set, the second set, the third set, and the fourth set of strip-shaped getters 5 includes two strip-shaped getters 5.

In some embodiments, a vacuum glass window may be provided. The vacuum glass window includes a window frame and a vacuum glass according to any embodiments of the present disclosure. In some embodiments, the vacuum glass in any of the foregoing Embodiments 1 through 21 may be used in a vacuum glass window with a window frame.

In some embodiments, an inner edge of strip-shaped getter 5 may not exceed an inner edge of the window frame, so that strip-shaped getter 5 is hidden in the window frame, and the aesthetic appearance of the vacuum glass window is improved without additional efforts of hiding. In some embodiments, the inner edge of strip-shaped getter 5 may not exceed an inner edge of a press strip or a sealant on the inner side of the window frame at a corresponding position.

In some embodiments, a vacuum glass or a vacuum glass window may include one or two glass sheets in addition to upper glass sheet 1 and lower glass sheet 2 that forming the above-mentioned vacuum glass. When one additional glass sheet is added, a vacuum layer, an adhesive layer, or a hollow layer may be formed between the added glass sheet and the above-mentioned vacuum glass. In some embodiments, a dimension of the added glass sheet may be greater than or equal to the dimension of the two glass sheets forming the above-mentioned vacuum glass. When two additional glass sheets are added, a vacuum layer, an adhesive layer, or a hollow layer may be formed between the two added glass sheets, and/or a vacuum layer, an adhesive layer, or a hollow layer may be formed between the two added glass sheets and the two glass sheets forming the above-mentioned vacuum glass.

It is understood by those skilled in the art that, the vacuum glass and the vacuum glass window are not limited by the structure mentioned above, and may include more or fewer components than those as illustrated, or some components may be combined, or a different component may be utilized.

The above descriptions are merely embodiments of the present disclosure, and the present disclosure is not limited thereto. Modifications, equivalent substitutions, and improvements made without departing from the conception and principle of the present disclosure shall fall within the protection scope of the present disclosure.

Further embodiments also include various subsets of the above embodiments including embodiments as shown in FIGS. 1 through 7J combined or otherwise re-arranged in various other embodiments.

Although the detailed description contains many specifics, these should not be construed as limiting the scope of the disclosure but merely as illustrating different examples and aspects of the disclosure. It should be appreciated that the scope of the disclosure includes other embodiments not discussed in detail above.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

It will be understood that, although the terms "first," "second," etc. may be used herein to describe various elements or steps, these elements or steps should not be limited by these terms. These terms are only used to distinguish one element or step from another.

The terminology used herein is for the purpose of describing particular embodiments only and is not intended to be limiting to the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises," "includes," "including," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for the purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art to best utilize the disclosure and the various embodiments.

What is claimed is:

1. A vacuum glass, comprising:
- a first glass sheet;
- a second glass sheet;
- a vacuum layer arranged between the first glass sheet and the second glass sheet;
- a plurality of supporting members arranged within the vacuum layer;
- a sealing portion arranged on an edge portion of the vacuum layer, configured to seal the vacuum layer; and
- a strip-shaped getter arranged within the vacuum layer, the strip-shaped getter being arranged close to and substantially parallel to the sealing portion at a first side of the vacuum glass,
- wherein a distance between an outer edge of the strip-shaped getter and an inner wall of the sealing portion at the first side of the vacuum glass is larger than or equal to about 0.2 mm,
- wherein a width of the strip-shaped getter ranges from about 2 mm to about 8 mm,
- wherein the strip-shaped getter is a non-evapotranspiration getter, and
- wherein the vacuum glass does not comprise an air outlet.

2. The vacuum glass according to claim 1, wherein a distance between an inner edge of the strip-shaped getter and an outer edge of the vacuum glass ranges from about 6 mm to about 35 mm.

3. The vacuum glass according to claim 1, wherein a distance between an inner edge of the strip-shaped getter and an outer edge of the vacuum glass ranges from about 10 mm to about 25 mm.

4. The vacuum glass according to claim 1, wherein a width of the sealing portion ranges from about 3 mm to about 10 mm.

5. The vacuum glass according to claim 1, wherein the sealing portion is a metal sealing portion or a glass sealing portion.

6. The vacuum glass according to claim 1, wherein an inner side of each of the first glass sheet and the second glass sheet does not comprise a getter accommodating groove.

7. The vacuum glass according to claim 1, further comprising one or more sets of strip-shaped getters.

8. The vacuum glass according to claim 7, wherein each set of strip-shaped getters comprises one or more strip-shaped getters.

9. The vacuum glass according to claim 1, wherein:
the vacuum glass comprises a first set of strip-shaped getters at the first side of the vacuum glass; and
the first set of strip-shaped getters comprises one or more strip-shaped getters.

10. The vacuum glass according to claim 1, wherein:
the vacuum glass comprises a first set of strip-shaped getters at the first side of the vacuum glass and a second set of strip-shaped getters at a second side of the vacuum glass; and
each of the first set of strip-shaped getters and the second set of strip-shaped getters comprises one or more strip-shaped getters.

11. The vacuum glass according to claim 1, wherein:
the vacuum glass comprises a first set of strip-shaped getters at the first side of the vacuum glass, a second set of strip-shaped getters at a second side of the vacuum glass, and a third set of strip-shaped getters at a third side of the vacuum glass; and
each of the first set of strip-shaped getters, the second set of strip-shaped getters, and the third set of strip-shaped getters comprises one or more strip-shaped getters.

12. The vacuum glass according to claim 1, wherein:
the vacuum glass comprises a first set of strip-shaped getters at the first side of the vacuum glass, a second set of strip-shaped getters at a second side of the vacuum glass, a third set of strip-shaped getters at a third side of the vacuum glass, and a fourth set of strip-shaped getters at a fourth side of the vacuum glass; and
each of the first set of strip-shaped getters, the second set of strip-shaped getters, the third set of strip-shaped getters, and the fourth set of strip-shaped getters comprises one or more strip-shaped getters.

13. A vacuum glass window, comprising:
a window frame; and
a vacuum glass, wherein the vacuum glass comprises:
a first glass sheet;
a second glass sheet;
a vacuum layer arranged between the first glass sheet and the second glass sheet;
a plurality of supporting members arranged within the vacuum layer;
a sealing portion arranged on an edge portion of the vacuum layer, configured to seal the vacuum layer; and
a strip-shaped getter arranged within the vacuum layer, the strip-shaped getter being arranged close to and substantially parallel to the sealing portion at a first side of the vacuum glass window,
wherein a distance between an outer edge of the strip-shaped getter and an inner wall of the sealing portion at the first side of the vacuum glass window is larger than or equal to about 0.2 mm,
wherein a width of the strip-shaped getter ranges from about 2 mm to about 8 mm,
wherein the strip-shaped getter is a non-evapotranspiration getter, and
wherein the vacuum glass does not comprise an air outlet.

14. The vacuum glass window according to claim 13, wherein an inner side of each of the first glass sheet and the second glass sheet does not comprise a getter accommodating groove.

15. The vacuum glass window according to claim 13, wherein an inner edge of the strip-shaped getter does not exceed an inner edge of the window frame at the first side of the vacuum glass window.

16. The vacuum glass window according to claim 13, wherein an inner edge of the strip-shaped getter does not exceed an inner edge of a press strip or a sealant arranged on an inner side of the window frame at the first side of the vacuum glass window.

17. The vacuum glass window according to claim 13, further comprising a third glass sheet, wherein a vacuum layer, an adhesive layer, or a hollow layer is formed between the third glass and the vacuum glass.

* * * * *